United States Patent [19]

Brown

[11] 3,916,500
[45] Nov. 4, 1975

[54] PIPE HANDLING APPARATUS

[76] Inventor: Cicero C. Brown, 5429 Sturbridge Drive, Houston, Tex. 77027

[22] Filed: Jan. 16, 1974

[21] Appl. No.: 433,733

Related U.S. Application Data

[63] Continuation-in-part of Ser. No. 256,255, May 24, 1972, Pat. No. 3,792,783, which is a continuation-in-part of Ser. No. 125,740, March 18, 1971, Pat. No. 3,706,347.

[52] U.S. Cl. .................. 29/240; 166/77.5; 175/85; 214/1 P; 214/2.5
[51] Int. Cl.² ......................................... E21B 19/14
[58] Field of Search ...... 214/1 P, 1 PB, 2.5, DIG. 3; 175/85; 166/77.5; 29/240

[56] References Cited
UNITED STATES PATENTS

| | | | |
|---|---|---|---|
| 2,900,091 | 8/1959 | Minter | 214/2.5 |
| 3,053,401 | 9/1962 | Jinkins, Jr. | 214/2.5 |
| 3,177,944 | 4/1965 | Knights | 214/2.5 X |
| 3,254,776 | 6/1966 | Brown | 214/2.5 |
| 3,559,821 | 2/1971 | James | 214/2.5 |
| 3,706,347 | 12/1972 | Brown | 214/2.5 |

FOREIGN PATENTS OR APPLICATIONS 1,477,602   3/1967   France................ 214/1 P

*Primary Examiner*—Frank E. Werner
*Attorney, Agent, or Firm*—Torres & Berryhill

[57] ABSTRACT

Disclosed is a pipe handling apparatus for delivering pipe sections to a well drilling derrick or for receiving such pipe from the derrick and placing it in a pipe rack. The apparatus includes a pipe rack for storage of pipe, a conveyor disposed along the rack and extending to the derrick and pipe lift means for loading pipe from any level of the rack onto the conveyor. Powering pivot means function to raise and lower one end of the conveyor relative to the derrick floor. Power tilt means tilt the conveyor as required to eject the pipe sections from the conveyor onto the rack. Power drive means control movement of the pipe sections along the length of the conveyor as the pipe is being moved to or from the derrick. The conveyor carries a device for threadedly joining two or more pipe sections before they are delivered to the derrick.

In the method, a first section of pipe is removed from the rack and placed in the horizontal conveyor in a pipe loading position. The first section is then moved through the conveyor toward the derrick to a pipe threading position and a second pipe section is removed from the rack and placed in the pipe loading position. The second pipe section is then rotated to connect it to the first section. After the second pipe section is in place, one end of the conveyor is pivoted up toward the derrick floor and the joined sections are moved from the conveyor to the derrick. The procedure is reversed for removing pipe from the derrick.

29 Claims, 23 Drawing Figures

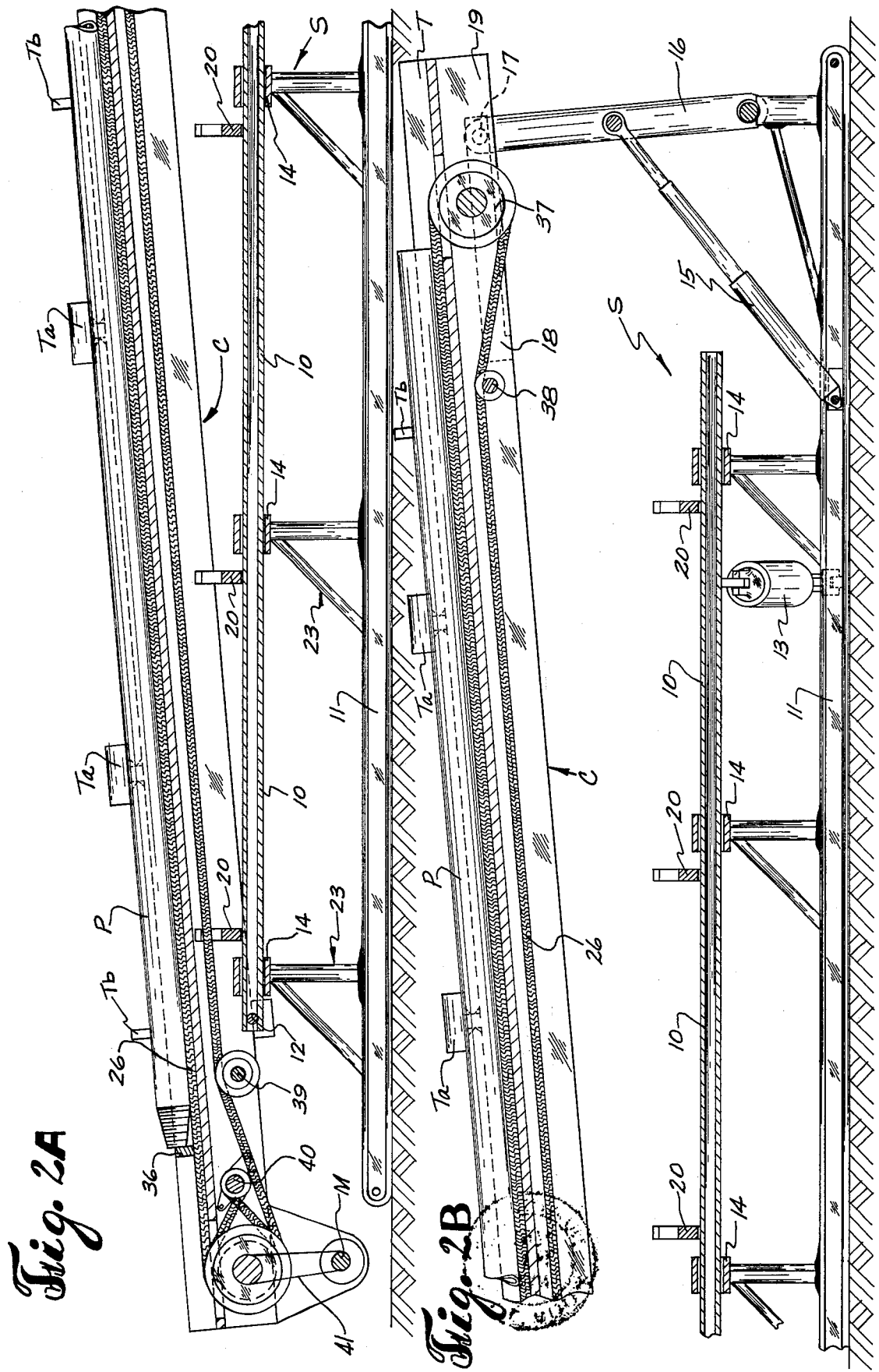

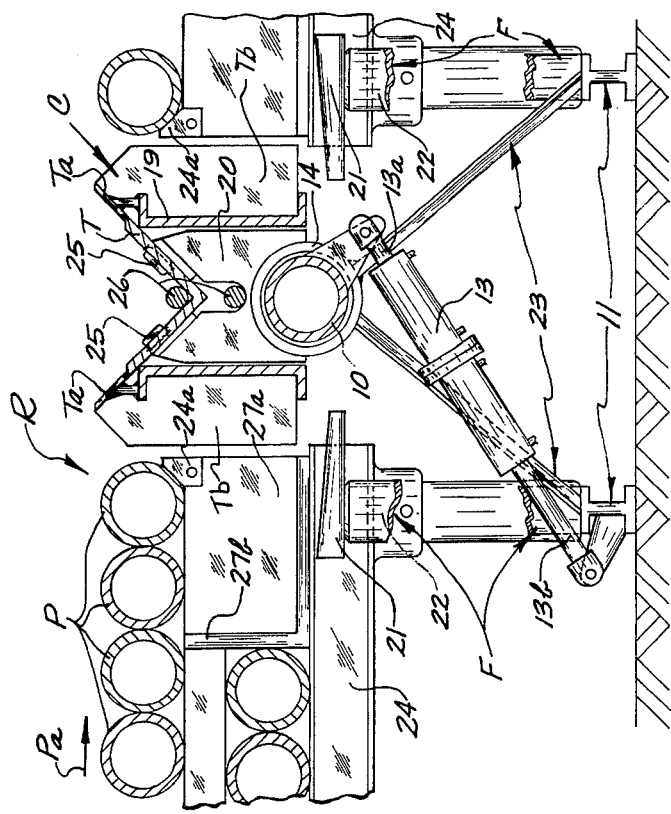
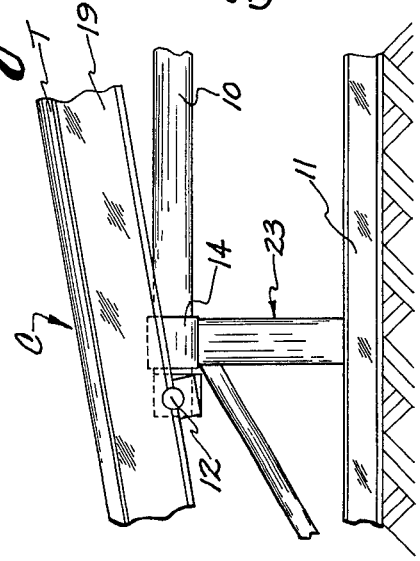
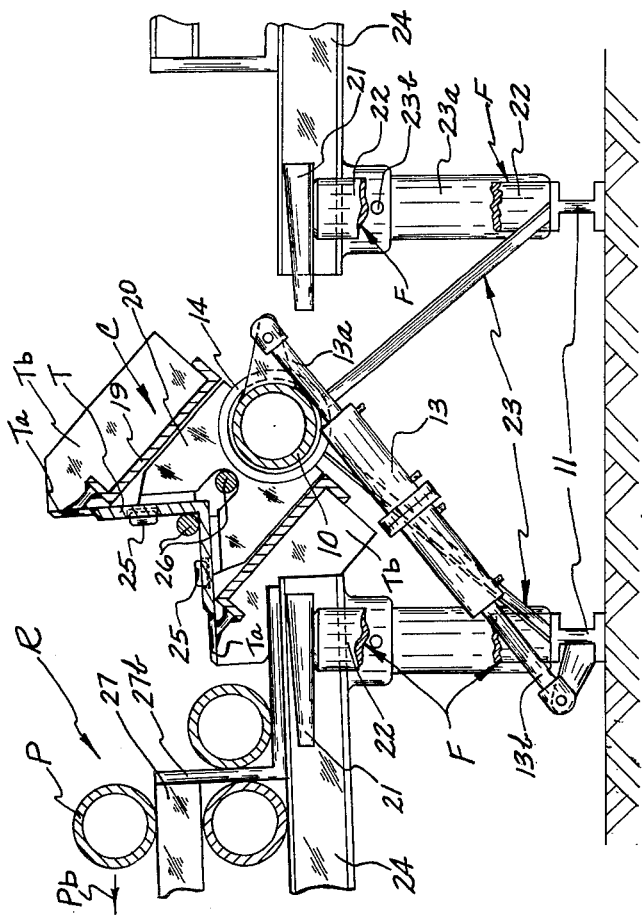
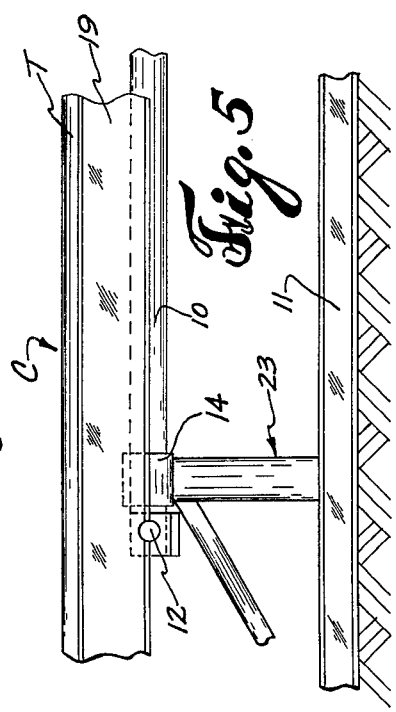

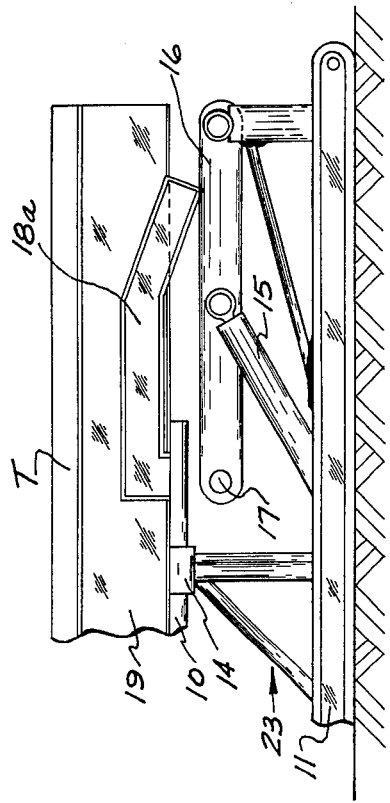
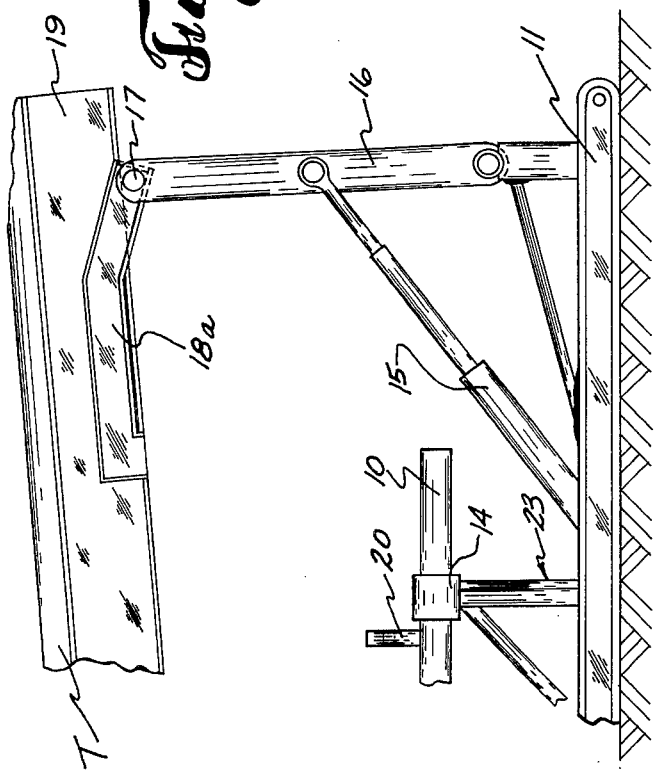
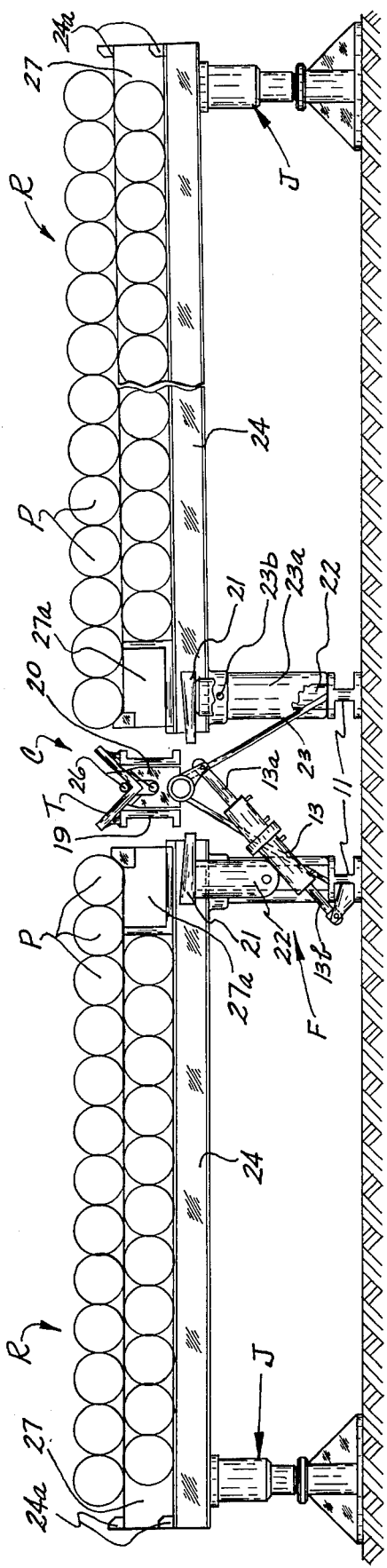

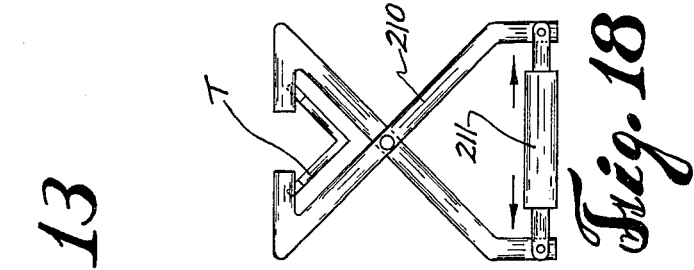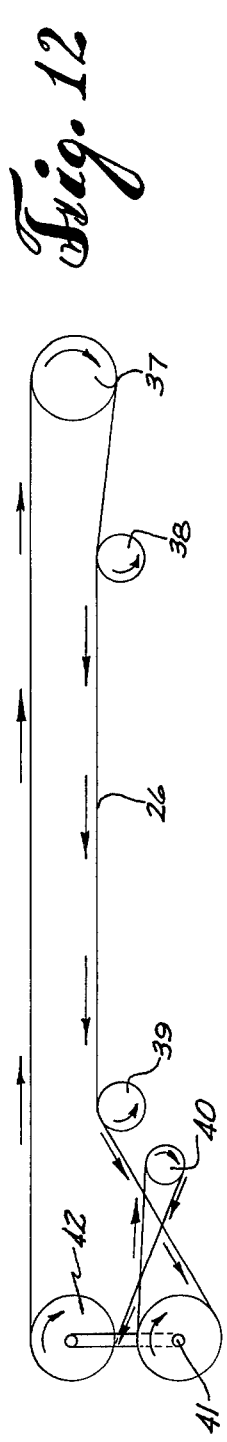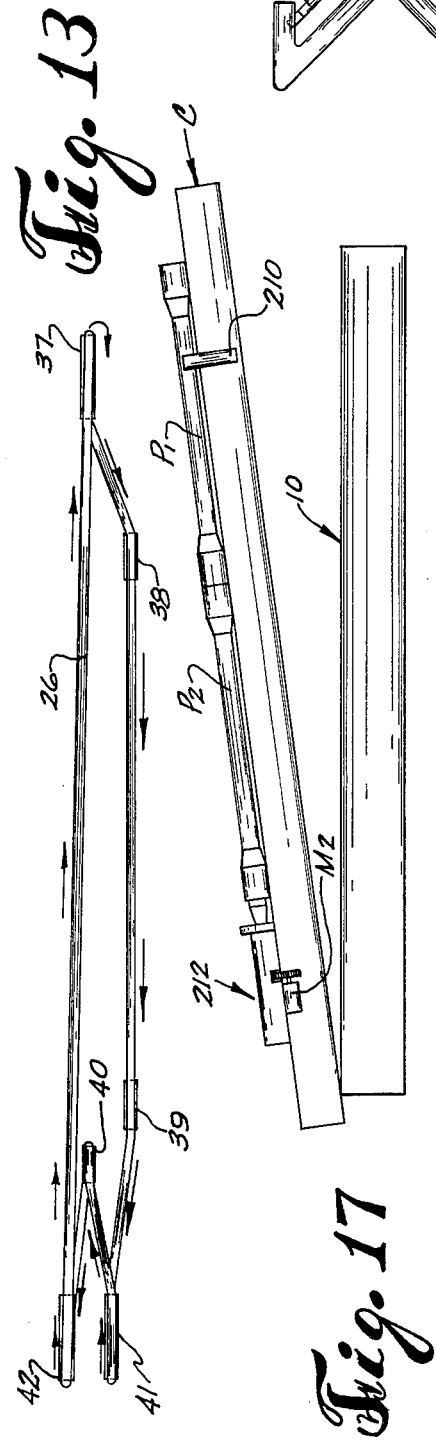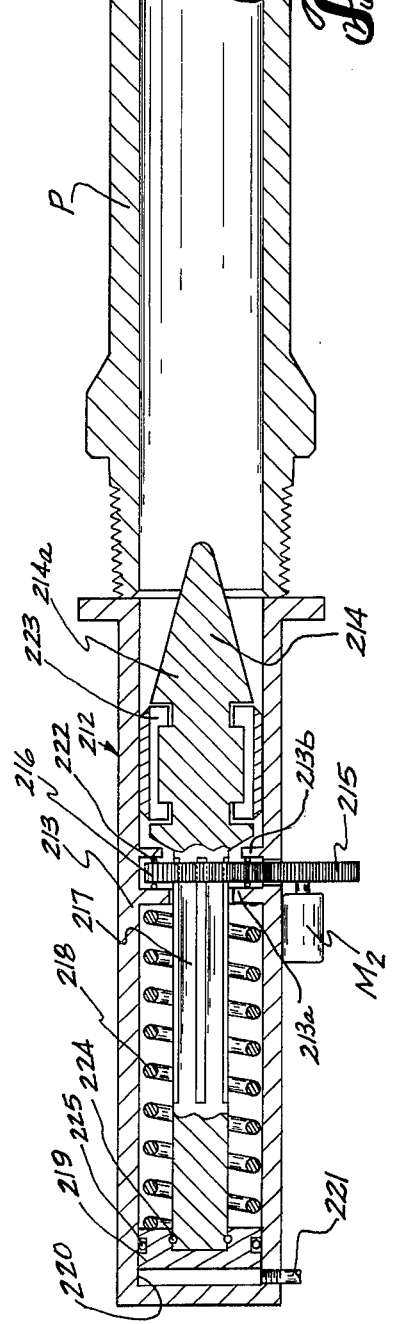

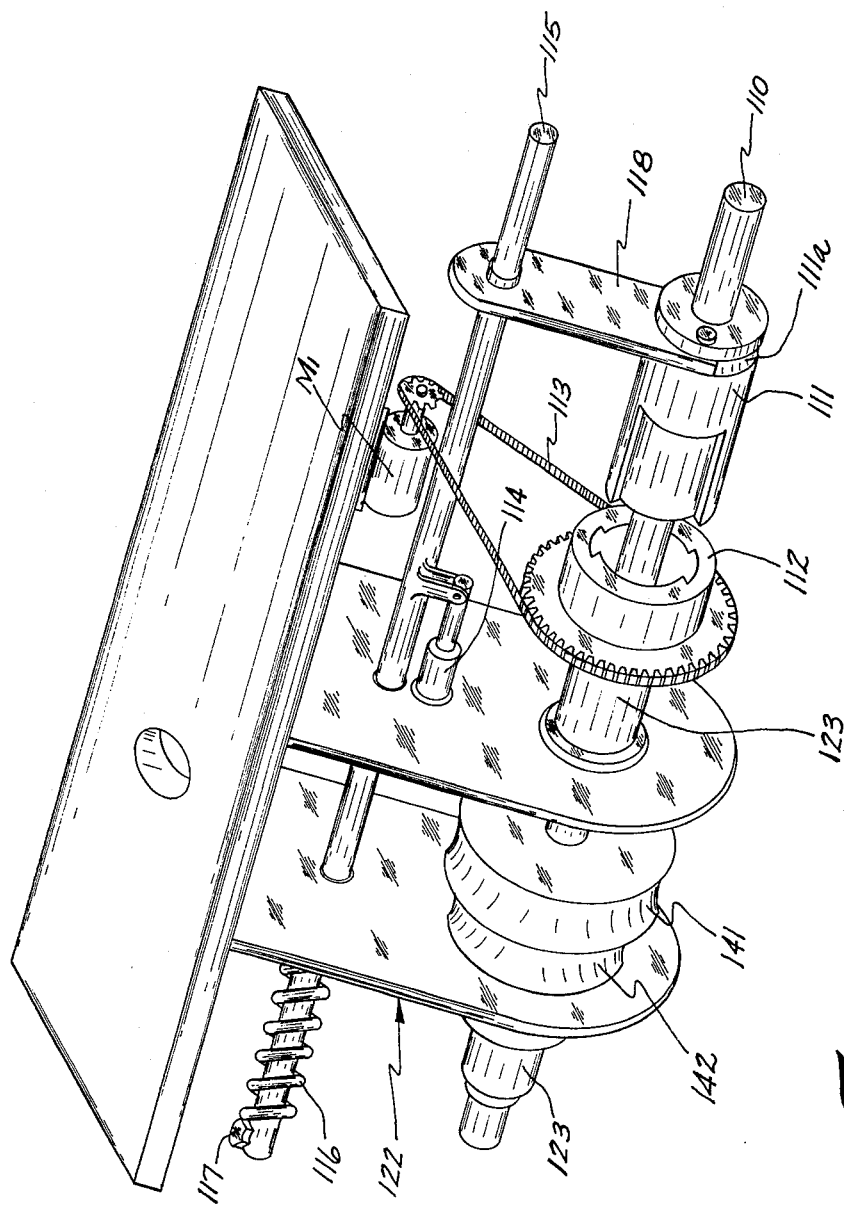

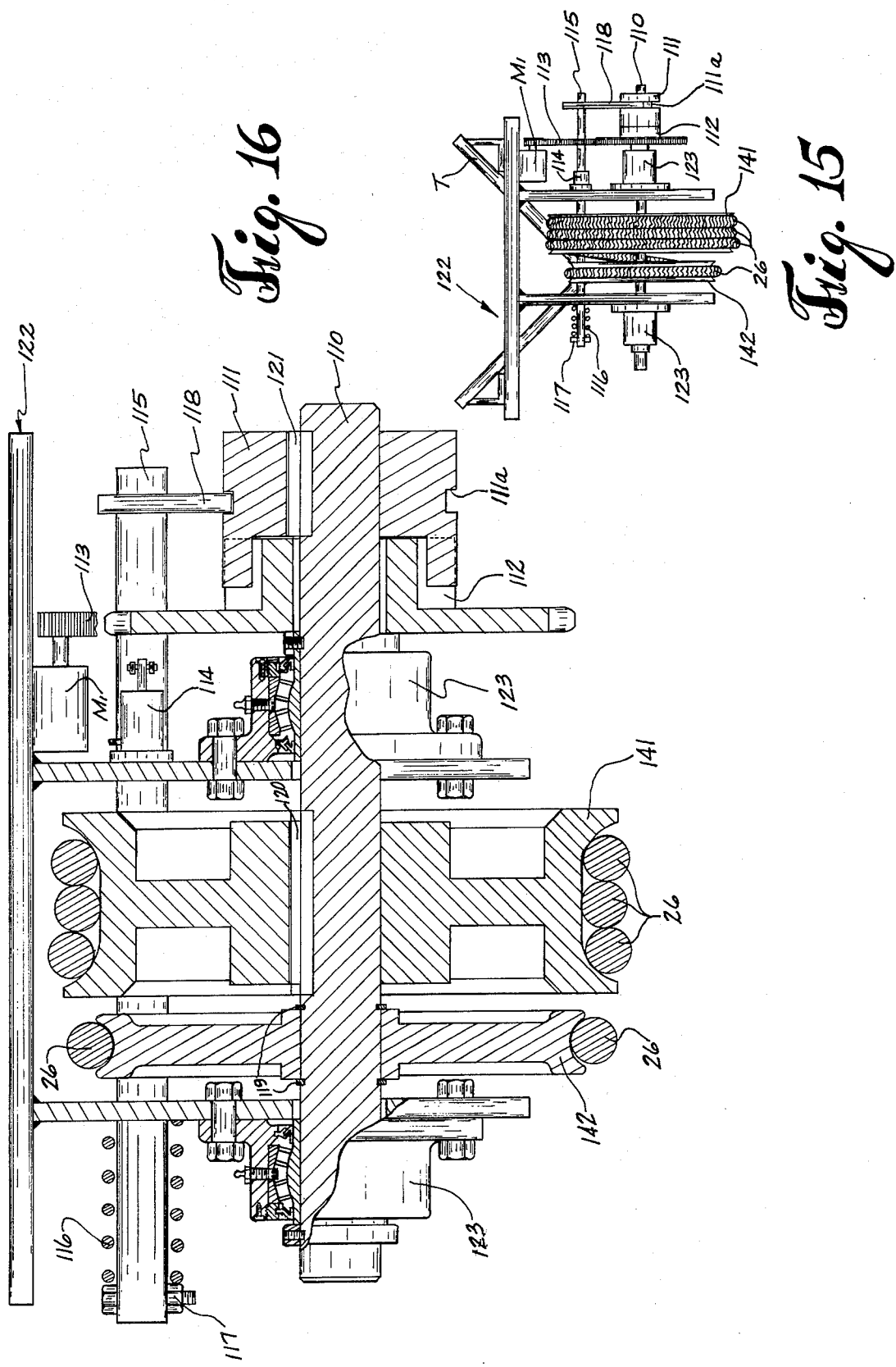

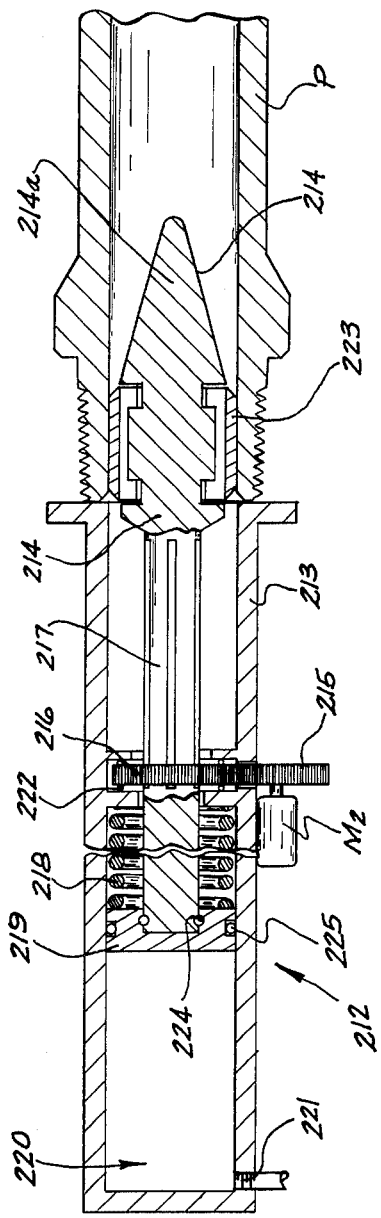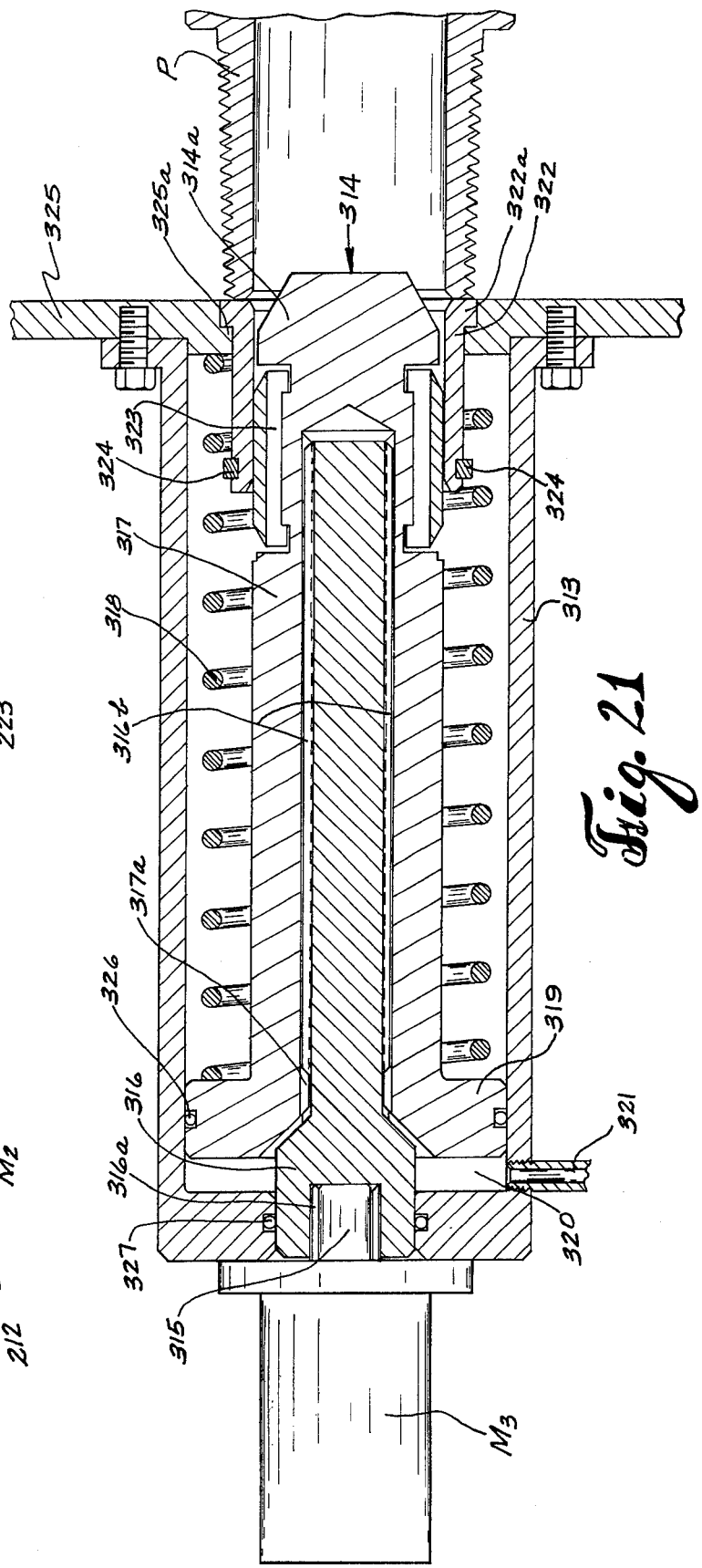

PIPE HANDLING APPARATUS

CROSS-REFERENCE TO RELATED APPLICATION

The present application is a continuation-in-part of copending patent application Ser. No. 256,255 filed on May 24, 1972, now U.S. Pat. No. 3,792,783, by Cicero C. Brown, which is a continuation-in-part of Ser. no. 125,740, filed on Mar. 18, 1971, now U.S. Pat. No. 3,706,347, by Cicero C. Brown.

BACKGROUND OF THE INVENTION

1. Field of the Invention

The present invention pertains to oil and/or gas drilling systems. In particular, the invention concerns pipe handling systems for moving pipe sections to and from a well drilling derrick.

2. Description of the Prior Art

In the drilling of oil and gas wells, the drill string is made up of pipe segments commonly stored upright within the derrick. These pipe segments, usually assembled in groups of three to form a "stand", are picked up individually by conventional hoist means mounted in the derrick and successively screwed into the string of pipe already suspended in the well bore. In withdrawing the drill string, the procedure is reversed with the stands being unscrewed from the suspended string as the string is withdrawn from the well, and returned to the vertical storage position. Conventionally, these operations require considerable manual labor and expenditure of time, particularly in making a so-called "round trip" in which the entire drill string is withdrawn from the well to change a bit, or for other purposes, and then returned to the bottom of the well bore.

U.S. pat. No. 3,706,347 discloses an improved pipe handling system which includes power operated conveyer means for transferring pipe sections from horizontal storage racks outside the derrick to a swivel supported by the derrick hoist. A pair of storage racks for the pipe sections is disposed on opposite sides of the conveyor means. The latter device includes a trough which is tiltably mounted to turn from side to side to receive pipe sections in the trough from one rack or the other, or to eject the pipe sections from the trough onto the racks. The conveyor means includes articulated rearward and forward trough sections pivotally connected to permit vertical angular movment of the forward section relative to the rearward section, thus providing an inclined channel by which pipe sections are transferred to and from the derrick floor, ordinarily elevated some height above the pipe racks. The various power operated elements of the system and their arrangement are such as to greatly reduce much of the manual effort, as well as time and expense, ordinarily required in handling the pipe.

Improvements in a system for handling pipe are also described in the previously identified U.S. Patent application Ser. No. 256,255. The prior application describes feed means to transfer the pipe sections from the racks to the trough of the conveyor means without tilting the trough. A guide means is also included to ensure proper vertical angular movement by the trough. Furthermore, the receiving trough of the conveyor means is a unitary structure which is pivoted near one end to allow vertical angular movement of the entire trough. In this manner, the pipe section, while being raised or lowered, is supported along its entire length rather than just at its ends. Multiple joined pipe sections may thus be handled without undue bending stress which may occur with the use of an articulated trough.

SUMMARY OF THE INVENTION

The present invention includes horizontal storage racks, for single or multiple pipe sections, located adjacent a conveyor unit. The conveyor is equipped with a receiving trough which delivers pipe from the racks to a drilling derrick, and back again to the racks. A feed mechanism transfer the pipe from the racks to the trough where the power operated conveyor advances them to the derrick.

An A-frame third-order lever, operated by a piston and cylinder powered by fluid pressure, engages tracks on both of the trough skirt supports to effect vertical angular movement of the trough. The engagement of the lever in the track also inhibits tilt of the trough when the latter is elevated. When the trough is lowered and in position to move pipe to or receive pipe from the storage racks, the lever is disengaged, allowing the trough to tilt.

A combination double-action fluid pressure cylinder, supported at each end by a pivot point, provides a tilt means for the trough which requires operation of only one piston for each tilt motion. Other connection schemes require that both pistons operate for each tilt motion.

An improved method for stringing the conveyor means cable provides greater tensions retention and increased traction for driving the conveyor. A clutch arrangement is also provided for permitting disengagement of the conveyor driver to permit free-wheeling of the cable when pipe is being received from the derrick. When the clutch is engaged, the conveyor drive may function as a brake for pipe being lowered from the derrick. Rollers are provided to support the pipe sections in the trough allowing faster movement of the pipe to and from the derrick.

The apparatus of the present invention is also equipped with improved lift devices operated by fluid pressure which feed the pipe sections to the trough. The lift devices may also be used to lift pipe from multiple-layer storage racks and deposit it into the conveyor and to lift pipe on the rack from one layer to a higher layer.

Improved power jacks support the pipe racks so that their inclination may be varied to cause the pipe sections to roll either away from or toward the receiving trough, as required for moving pipe off of or onto the trough respectively. The jacks are also positively powered downwardly and upwardly to provide faster operation. The powered down drive overcomes a problem with prior jack means in which the friction of the jacks and the slow escape rate of the powering fluid prevent a reasonably rapid fall of the load when the pressure of the power fluid is released.

The present invention also includes a mechanism for joining two or more pipe sections together while the pipe is in the trough. The mechanism employs a friction clamp to anchor one pipe section and a driver to rotate a second pipe section so that the two sections are threadedly engaged. Time, expense and effort may be save by thus joining the pipe sections during the same operation that causes them to be fed to the derrick. Joining the sections on the trough requires use of a pipe rack no larger than is needed to accommodate single-section pipe lengths. The joined sections may also be broken apart in the trough by reversing the joining process. A method is also described in which pipe lengths are joined or separated on the conveyor before being moved to the derrick or placed on the rack respectively.

Other features, objects and advantages of the present invention will become more readily apparent from the following detailed description when read in conjunction with the accompanying drawing which illustrate preferred embodiments of the invention.

BRIEF DESCRIPTIONS OF THE DRAWINGS

FIGS. 1A and 1B, together, comprise a side elevational view, partially in section, illustrating the conveyor unit of the present invention in the lowered position for receiving pipe sections from the pipe racks, or for transferring pipe to the pipe racks;

FIGS. 2A and 2B, together, comprise a side elevational view, similar to FIGS. 1A and 1B, partially in section, illustrating the conveyor unit in a vertically inclined position for transferring pipe to the well derrick, or receiving pipe from the well derrick;

FIG. 3 is a partial transverse cross-sectional view of the conveyor unit, taken along the line 3—3 of FIG. 1B, illustrating the tilt cylinder and pipe feeders;

FIG. 4 is a partial transverse cross-sectional view, similar to that of FIG. 3, illustrating the conveyor unit in a tilted position for transferring pipe from the trough to a pipe rack;

FIG. 5 is a partial side elevational view of the conveyor unit in the lowered position, illustrating the pivot support of the trough skirt frame by the support bed of the unit;

FIG. 6 is a partial side elevational view, similar to that of FIG. 5, illustrating the conveyor unit in a vertically inclined position;

FIG. 7 is a partial side elevational view of the conveyor unit in the lowered position, illustrating the A-frame lever, the lift cylinder, and a modified form of the lift track;

FIG. 8 is a side elevational view, similar to that of FIG. 7, illustrating the conveyor unit in a vertically inclined position;

FIG. 11 is a transverse cross-sectional view, taken along the line 3—3 of FIG. 1B, of the conveyor unit, pipe storage racks, and tilt mechanism of the conveyor unit.

FIG. 12 is a schematic diagram, in side elevation, illustrating the path of the drive cable employed in the conveyor unit;

FIG. 13 is a schematic diagram, in plan view, illustrating the cable-pulley arrangement of FIG. 12;

FIG. 14 is a perspective view of the conveyor cable drive mechanism of the present invention illustrating the drive motor and clutch;

FIG. 15 is a transverse view, on a reduced scale, of the conveyor drive motor and clutch of FIG. 14;

FIG. 16 is an enlarged scale transverse view, partially in section, of the assembly of FIGS. 14 and 15;

FIG. 17 is a schematic side elevational view of the conveyor unit and pivot mount illustrating the use of a rotary driver and friction clamp to join pipe sections in the trough of the conveyor unit;

FIG. 18 is an enlarged scale, transverse view of the friction clamp of FIG. 17;

FIG. 19 is an elevational view, in partial section and on an enlarged scale, of one embodiment of a rotary driver for joining pipe sections, illustrating the driver disengaged from a pipe section;

FIG. 20 is a view similar to FIG. 19, illustrating the rotary driver engaged to a pipe section; and FIG. 21 is an elevational view in partial section, similar to FIG. 19, illustrating a modified rotary driver.

DESCRIPTION OF THE PREFERRED EMBODIMENT

Figure 1A:
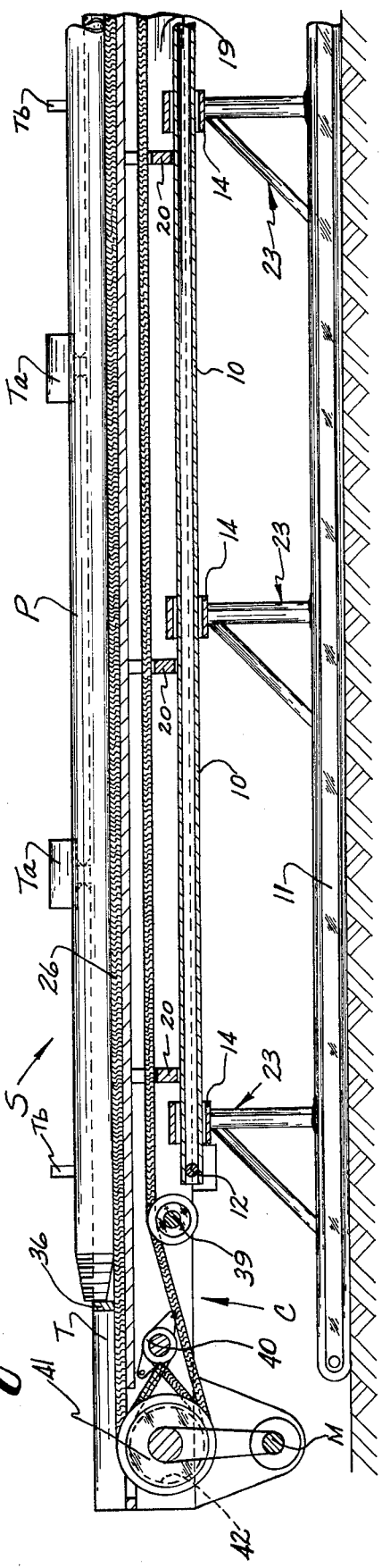
Figure 1B:
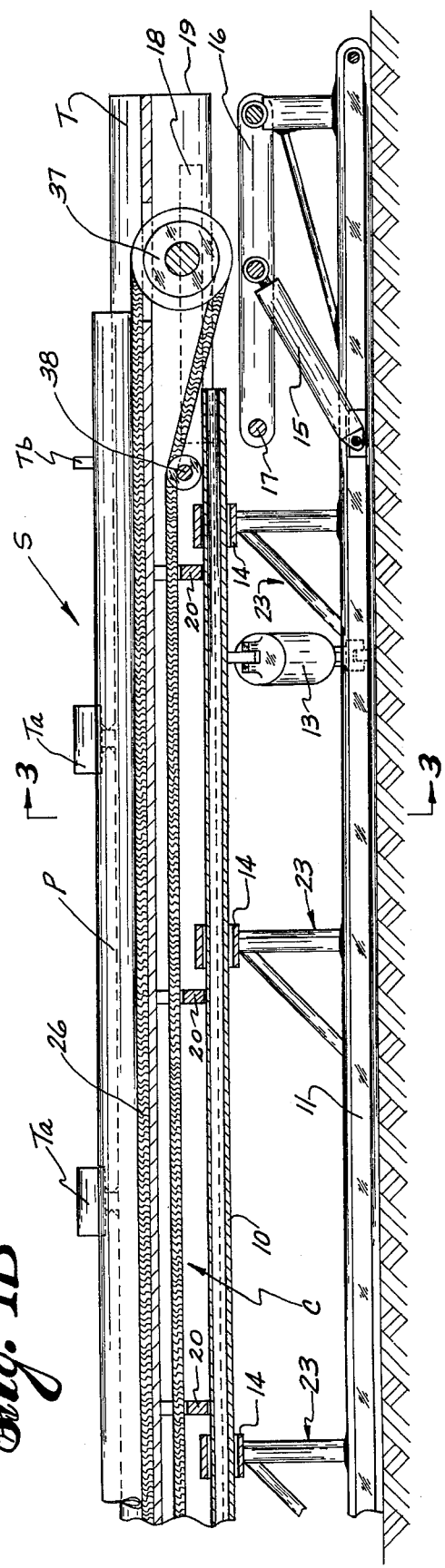

Referring jointly to FIGS. 1A, 1B and 11 of the drawings, there is illustrated a pipe handling system S comprising horizontal pipe racks R, having rack bars 24, disposed on each side of a conveyor unit, shown generally at C, for transferring pipe sections P back and forth between the pipe racks R and a derrick (not shown). The conveyor unit C is supported by frames, each shown generally as 23, which rest on a skid member frame 11. The adjacent ends of the rack bars 24 are supported by vertical supports 23a which also are secured to the skid frame 11. A pivot connection 23b between each rack bar 24 and the corresponding vertical support 23a permits vertical angular movement by the rack bar 24. The outer ends of the rack bars 24 are each supported by a power jack, shown generally as J.

As best illustrated in FIGS. 3–6, the conveyor unit C is disposed longitudinally and centrally of the skid member frame 11 in the space between the inner ends of the rack bars 24. The unit C includes a pipe holding assembly formed by a trough T supported between skirt frames 19. The holding assembly is pivotally mounted on a tubular support pipe 10 by a pivot pin 12. A series of trough braces 20 are rigidly attached to the pipe 10 to support the holding assembly when the assembly is in its lower position. A continuous conveyor cable 26 is disposed along and inside of the trough T and passes back beneath the trough T. The cable is arrayed on a drive system which employs pulleys 37 and 42.

From the described construction it may be appreciated that the trough T may be oriented in a continuous range of vertical inclinations. When the pipe holding assembly is in its lowest position, the trough T rests on the trough braces 20. The elevation of the trough T is accomplished by the extension, by fluid pressure, of a lift cylinder 15 which, in turn, raises an A-frame third-order lever 16. As shown in FIGS. 2B and 7, the A-frame lever 16 is generally horizontal when the lift cylinder 15 is collapsed, and there is no contact between the A-frame lever 16 and the conveyor unit C. However, as the A-frame lever 16 is raised, cam rollers 17 mounted on the A-frame lever 16 engage tracks 18, formed on each of the skirt frames 19. Then, as the A-frame lever 16 continues to rise, the cam rollers 17 traverse the tracks 18, causing the track end of the conveyor unit C to rise while the opposite end of the unit pivots about the pin 12. This produces vertical angular movement of the conveyor unit C which permits a communication between the raised end of the trough and the elevated derrick floor (not shown). FIGS. 7 and 8 display a modification employing non-collinearly disposed track segments 18a in which the forward track segment diverges downwardly along skirts 19. This configuration of the track segments 18a allows the trough to be raised through a range of adjustments which accommodates higher derrick floors.

The support pipe 10 passes through and is rotatable in support sleeves 14 which are rigidly affixed on the support frames 23. A combination double-action, fluid pressure tilt cylinder 13, pivotally mounted at one end of the skid member frame 11, and pivotally mounted at the other end to an arm on the support pipe 10, may be activated to cause the conveyor unit C to rotate along a longitudinal axis, tilting as shown in FIG. 4, toward one pipe rack R or the other. The tilt cylinder 13 comprises a pair of piston-cylinder systems, with an upper tilt rod 13a and a lower tilt rod 13b attached to the two piston heads (not shown). Each of the piston-cylinder systems is a double-action system, permitting the piston to be driven against a load in each direction. Thus, four drive movements are possible with the tilt cylinder 13, each movement requiring the activation of only one piston. The four movements result in tilting the conveyor unit C one way, leveling it, tilting it the other way, and leveling it again.

The conveyor unit includes an endless cable 26 which is aligned along the interior bottom of the trough T, and passed back along the exterior bottom of the trough T. FIGS. 1, 2, 3 and 4 best illustrate the cable arrangement. A lug 36 is fixed to the cable 26 within the trough T, and, when the cable is driven along the trough T toward the derrick, the lug 36 engages the end of a pipe P in the trough T, and pushes the pipe toward the derrick. In the process of removing pipe P from the derrick, the lug 36 catches the end of the pipe and is used to control the rate of descent of the pipe P through control of cable motion.

A series of rollers 25 are positioned along the trough T to support the pipe P within the trough and to reduce the frictional forces opposing movement of the pipe through the trough. Trough guides Ta, comprising upward extensions of the walls of the trough T, effectively provide an increase in trough depth without an attendant increase in weight. (Lift guides Tb assist in loading pipe P from the racks R into the trough T as described below.) The guides Ta also aid in the transfer of pipe between the trough T and the racks R.

As best illustrated in FIGS. 12 and 13, in alignment pulleys 37 and 42 guide the cable 26 between the trough T and the other cable pulleys, which include idler pulleys 38 and 39, a tension pulley 40, and a drive pulley 41. Additional idler pulleys may be used where needed, as for example, between the idler pulleys 38 and 39. The drive pulley 41 is engaged by a chain or gear drive to a drive motor M. For adequate frictional force between the cable 26 and the drive pulley 41, the drive pulley 41 is preferably of sufficient groove width to accommodate multiple wraps of the cable 26.

Each pipe rack R comprises a series of laterally extending rack bars 24 in the form of beams, each bar pivotally supported at its inner end on a support frame 23a by a pivot connection 23b. The outer end of each bar is supported by a power jack J. The pipe P is stored perpendicularly on the bars 24 so that each separate pipe segment is supported by at least two rack bars 24. The vertical angular orientations of the rack bars 24 are altered by changing the height of the jacks J to permit rolling of the pipe P resting on the racks R toward or away from the direction of the conveyor unit C. Studs 24a prevent the pipe from rolling off the end of the rack bars 24. The studs 24a may be fixed at both ends of the rack bars to achieve this result.

Multiple layer stacking of pipe P on the racks R may be accomplished with the use of pipe rack spacers 27, comprising a series of beams placed on the layer of pipe already on the rack bars 24. Each beam 27 has affixed at its inner end an L-shaped retaining member 27b that rests on a rack bar 24 and stops the pipe P on the rack bars 24 from rolling beyond the pipe retaining member 27b. Such rack spacers (not shown) may be placed above the second pipe layer for additional layering of the stored pipe P. Suitable studs (not shown) may be placed at the outside ends of the beams 27 and bars 24 to hold the racked pipe on the rack. Means (not illustrated) are also provided to hold the pipe retainers 27b in place to prevent the bottom layer of pipe from rolling toward the conveyor C as the upper pipe layer is being removed from the rack. When pipe is being transferred to or from such an upper storage layer, the pipe retaining members 27b space the lower level of pipe from the lift apparatus for a purpose to be described. Rack spacer extensions 27a (FIG. 3) are employed with the spacers 27 to permit the pipe P on the pipe rack spacers 27 to be rolled adjacent to the conveyor unit C. Studs 24a are employed on the extensions 27a to prevent the pipe from rolling off of the rack. The extensions 27a may be held in place by any suitable means which will also permit them to be removed for the racking operation.

Four pipe feeders F, two at each end and on either side of the conveyor C, are secured to the skid member frame 11. Each feeder F comprises a fluid pressure loader cylinder 22 and a lifting head with an inclined top surface 21. The loader cylinder 22 serves to raise and lower the lifting head 21 which can be rotated horizontally through 180°. Although only four feeder F are described here, as many more as are more needed may be added to each side of the conveyor C.

To load pipe P onto the conveyor unit, the jacks J are first elevated to cause the pipe to roll in the direction of the arrow Pa, illustrated in FIG. 3, that is, toward the conveyor C. The two loader cylinders 22 on one side of the conveyor C are then activated simultaneously to raise the lifting heads 21, which are oriented with their down-plane direction toward the conveyor unit C as shown in FIG. 3. The two lifting heads on the same side of the conveyor C catch the pipe and raise it during which time the inclination of the heads tends to roll the pipe toward the conveyor unit C. (The lift guides Tb prevent the pipe P from rolling off of the lifting heads until after the pipe P is raised above the top of the trough guides Ta.) When the pipe P is high enough to clear the trough guides Ta, the pipe rolls off of the lifting heads 21 and falls into the trough T. Once the heads 21 are lowered, the pipes on the rack spacers 27 roll toward the conveyor to occupy the space vacated by the removed pipe. The conveyor transports the pipe to the derrick and the described procedure is repeated to remove another pipe from the rack to the conveyor.

When loading pipe onto the second or higher layers of the pipe rack, the trough is initially tilted by the cylinder 13 causing the pipe to roll onto the bases of the L-shaped retaining members 27b, located on the rack bars 24 as illustrated in FIG. 4. It may be noted that the extensions 27a are removed during the racking procedure. With a pipe thus on the lowest level, and with the lifting heads 21 positioned as illustrated in FIG. 4, the feeders F on the same side of the conveyor C are simultaneously raised to elevate the pipe to the second level. Once the pipe clears the pipe retaining members 27b, it rolls off of the heads 21 onto the rack spacer 27. The rack R is inclined (by proper positioning of the jacks J) so that the pipe rolls in the direction of the arrow P*b*. This procedure is repeated until the rack spacers 27 are fully loaded. Additional rack spacers (not shown) may then be added for providing further stacking layers.

Figure 9:
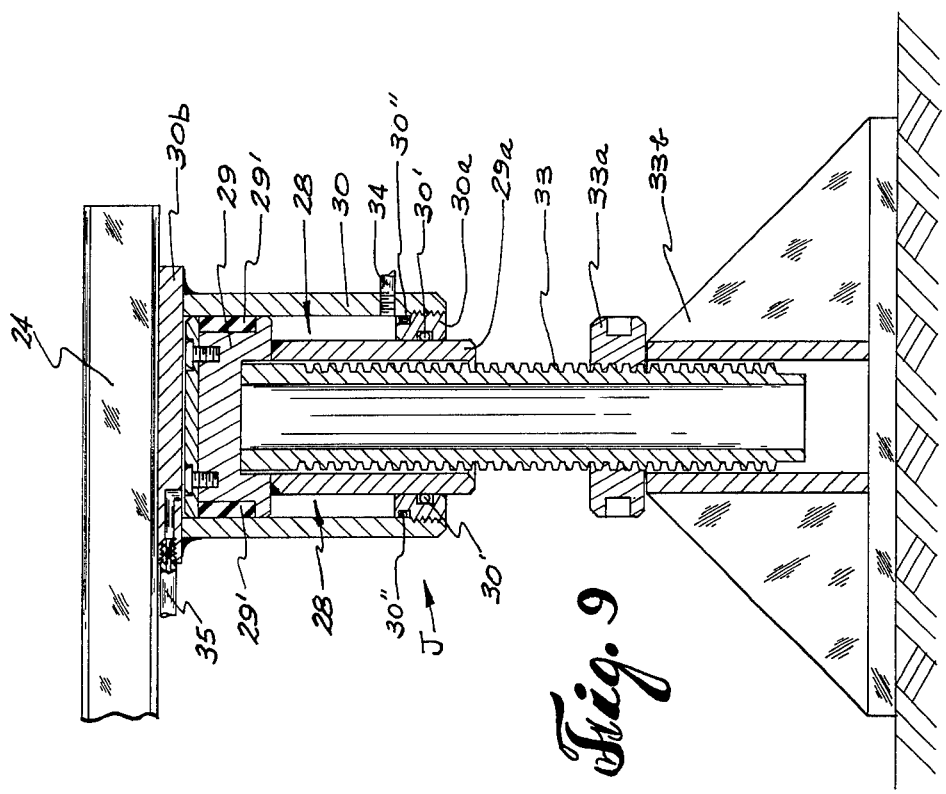
FIGS. 9 and 10 are elevational views, in partial section, of a double-action power jack for inclining the rack bars of the system, FIG. 9 illustrating the jack in a lowered position, and FIG. 10 illustrating the jack in a raised position.
Figure 10:
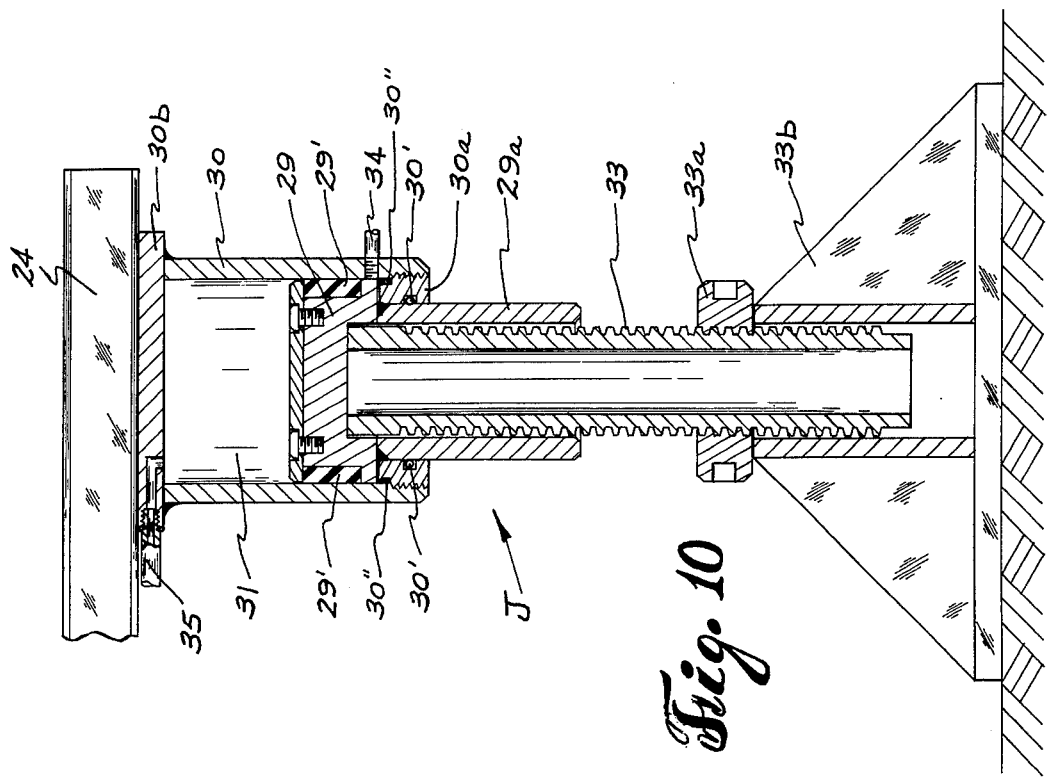

Details of the construction of the power jacks J are shown in FIGS. 9 and 10. Each jack J is supported on an externally threaded column 33 engaged by a leveler nut 33*a* and inserted in a base 33*b*. The adjustment of the leveler nut 33*a* determines the height above the base 33*b* that the support column 33 will reach. By an appropriate adjustment of the leveler nuts on all jacks J in the pipe racks R to compensate for uneven terrain, the tops of all support columns 33 may be placed at the same level. The support column is topped by a piston head 29 which is fluid sealed by a seal 29' for slidable movement inside a cylinder 30. The cylinder 30 is closed at its bottom by a cylinder collar 30*a* which is fluid sealed by an O-ring seal 30' for slidable movement over a sleeve 29*a* extending from the head 29, and by an O-ring seal 30'' between the collar 30*a* and the cylinder 30. The top of the cylinder is sealed by a top plate 30*b*.

Two fluid pressure chambers are thus formed at 28 and 31. Fluid pressure lines 34 and 35 communicate with the pressure chambers 28 and 31 respectively. An increase in pressure in the upper chamber 31 drives the cylinder 30 upwardly, raising the rack bar 24 as shown in FIG. 10, and an increase in pressure in the lower chamber 28 drives the cylinder 30 downwardly, lowering the rack bar 24, as shown in FIG. 9. The downward drive, using the pressure chamber 28, is necessary to overcome frictional forces and restricted fluid escape passages that prevent the reasonably rapid fall of the rack bar 24 under the force of gravity alone.

FIGS. 14–16 illustrate a modified form of the conveyor unit drive mechanism which is to be mounted at the end of the trough T away from the derrick. A three-turn drive pulley 141 is locked by a key 120 on a drive shaft 110. A spline 121 locks a gear wheel 111 to the same drive shaft 110 so that the gear wheel 111 is slidable along the drive shaft. One end of a forked arm 118 rides in a groove 111*a* in the gear wheel 111, while the other end of the arm is rigidly fixed on a second shaft 115. The drive shaft 110 is mounted on a frame, shown generally as 122, by two axially spaced bearing mounts 123, allowing rotation of the drive shaft 110 with respect to the frame 122. An alignment pulley 142, serving to align the cable 26 with the bottom of the trough T, is mounted for free-wheeling movement on the drive shaft 110, and held in place by two snap rings 119. Also free-wheeling on the drive shaft 110 is a clutch sprocket 112. The clutch sprocket 112 is coupled with a drive motor M1, by a chain 113. Other drives, including a belt drive, could be used if desired. When the gear wheel 111, which is rotatably fixed to the drive shaft 110, is engaged with the clutch 112, the drive shaft 110 is rotated by the motor M1. Rotation of the drive shaft 110 rotates the drive pulley 141.

The drag of the motor, when not powered, provides a brake when pipe P is being transferred from the derrick to the conveyor unit C, and whenever the conveyor unit must be slowed or stopped. The shaft 115, which controls the lateral position of the grear wheel 111 through the arm 118, is biased in one direction along its longitudinal axis by a spring 116 held on the shaft 115 by a nut and bolt 117, tending to urge the gear 111 into engagement with the clutch 112. A fluid pressure cylinder 114 is operable to drive the shaft 115 in the opposite direction when the pressure in the cylinder 114 is increased, causing the gear wheel 111 to disengage from the clutch 112. Thus, to drive the conveyor cable 26, the pressure cylinder 114 is deenergized so that the drive shaft 110 is connected to the motor M1 by action of the spring 116. Activation of the motor M1 causes the cable 26 to move. To allow the cable 26 to move freely, the motor M1 is stopped, and the pressure on the fluid pressure cylinder 114 is increased to disengage the gear wheel 111 from the clutch 112, permitting the drive shaft 110 to be moved independently of the motor M1. Braking is effected by stopping the motor with the cylinder 114 deenergized.

FIGS. 17–21 illustrate an embodiment of a mechanism for threadedly joining two or more pipe sections P1 and P2 in the trough T. FIG. 17 illustrates the replacement of the lug 36 with a rotary driver, shown generally at 212. The end of a first pipe section P1 positioned in the trough T is engaged by the driver 212 which in turn is attached to the cable 26. The first pipe section P1 is advanced to the forward end of the conveyor C, the driver 212 is returned to its initial position in the conveyor C, and a second pipe section P2 is placed in the trough T. A friction clamp 210, mounted on the conveyor unit C and activated by a power cylinder 211 (FIG. 18), locks the first pipe section P1 against rotary motion. The rotary driver 212 is then grippingly engaged with the second pipe section P2, and driven by a motor M2 to rotate the second pipe section P2 with respect to the first section P1. When the screw connection is complete between the pipe sections P1 and P2, the gripping engagement of the rotary driver 212 is disengaged from the pipe P2, and the joined pipe segments are advanced to the derrick floor by driving the conveyor cable 26. Additional pipe sections P3, etc. may also be joined to the first two sections by engaging the last-joined section by the friction clamp 210 while a new pipe section is rotated by the rotary driver 212.

One embodiment of a suitable rotary driver 212 is shown in FIG. 19. A tubular housing 213 encloses a driver probe 214 comprising a tapered head 214*a*, and a longitudinally grooved shaft 217. A ring gear 216, slidably mounted on and rotatably fixed to the shaft 217, is held in place by ball bearings 222 acting against internal housing shoulders 213*a* and 213*b*. The shaft 217 is fitted with a piston head 219 held in place by ball bearings 224. The piston head 219 is slidably sealed in the bore of the housing 213 by an O-ring seal 225. The ball bearings 224 allow rotation of the shaft 217 with respect to the piston head 219.

A fluid pressure chamber 220 is formed between the base of the housing 213 and the piston head 219. A compressed spring 218, compressed between the piston head 219 and the internal housing shoulder 213*a*, biases the piston head 219 in a direction tending to reduce the volume of the pressure chamber 220. To engage a pipe P, fluid pressure in the pressure chamber 220 is increased through a pressure line 221, expanding the pressure chamber 220, and causing the piston head 219 and the shaft 217 to advance and collapse the spring 218. When the forward section of the driver probe 214 is pushed inside the pipe P, as shown in FIG. 20, a motor M2, engaging the ring gear 216 through a drive gear 215, operates the driver probe 214 in rotary motion about its cylindrical axis. Initial rotary motion causes cam set shoes 223 to lock with the interior wall of the pipe P, with the result that the pipe P rotates with the driver probe 214. Termination of the motor drive rotation releases the cam set shoes 223 from the pipe P so that the driver probe 214 may be withdrawn from the pipe P by expansion of the spring 218 when the pressure in the chamber 220 is released. Detailed descriptions of such cam set shoes 223, as well as their operation, are given in U.S. Pats. Nos. 3,211,233 and 3,283,821.

A modified form of a rotary driver 212 is shown in FIG. 21. The driver probe 314 comprises a tapered head 314a and a shaft 317 ending in a piston head 319, which is sealed by packing 326 for slidable and rotatable motion within the bore of a cylindrical housing 313. A spring 318, compressed between the piston head 319 and a collar 325 bolted to the housing 313, tends to keep the driver probe 314 withdrawn into the housing 313. A drive draft 316, rotatably sealed by packing 327 in an opening in the base of the housing 313, fits inside the hollow body of the driver probe shaft 317. Splines 316b on the drive shaft are set between projections 317a on the inside of the driver probe shaft 317. A motor M3, mounted on the outside of the housing 313, turns an externally toothed shaft 315 which engages the drive shaft 316 through drive shaft gear teeth 316a. The beveled base of the drive shaft 316 prevents the driver probe piston head 319 from touching the base of the housing 313, thereby creating a fluid pressure chamber 320. This chamber 320 communicates with a fluid pressure source (not shown) through a fluid pressure line 321. When the fluid pressure in the chamber 320 is increased, the piston head 319 is driven forward toward the pipe P, collapsing the spring 318, and causing the tapered head 314a of the driver probe to enter the interior of the hollow pipe P. The shaft of the driver probe slides over the drive shaft 316, keeping the projections 317a engaged with the splines 316b of the drive shaft 316. A guide shaft 322, with a head flange 322a, seated against a lip 325a formed in the collar 325, is forced to slide forward with the driver probe 314 when the piston head 319 is pushed forward against the guide shaft 322. A split lock ring 324 prevents the guide shaft from moving forward completely beyond the collar 325, and thus prevents the piston head from contacting the collar 325. Cam set shoes 323, as described above, engage the inner wall of the pipe P upon rotation of the driver probe 314 within the pipe P. This rotation is generated by the motor M3, and translated through its motor shaft 315 and the drive shaft 316, which is engaged through the spline 316b and the projections 317a to the driver probe shaft 317, causing the driver probe 314 to rotate. The guide shaft 322 acts as a bearing, allowing the driver probe 314 to rotate with respect to the housing 313 and the collar 325.

When pipe P is being transferred from the derrick to the pipe racks R, joined pipe sections may be separated by reversing the steps outlined above for joining the pipe P, using the rotary driver 212 and the friction clamp 210 to break open the threaded pipe joints.

OPERATION OF THE SYSTEM

All power controls are generally operated from a control console (not shown). To transfer pipe P to the derrick, the pipe P is removed from the pipe racks R and placed in the conveyor C. To this end, the lifting heads 21 are oriented to slope toward the conveyor unit C, and appropriate studs 24a are placed on the internal ends of the rack bars 24. If the pipe is racked in multiple layers, the pipe rack spacers 27 and the extensions 27a are employed. Suitable studs 24a are placed on the inner ends of the extensions to hold the pipe in place. The power jacks J are then raised, causing the pipe P to roll along the racks toward the conveyor unit C. The two feeders F on one side of the conveyor unit C are activated to lift a pipe P along the lift guides Tb and over the trough guides Ta, allowing the pipe P to fall into the trough T and come to rest on the rollers 25. The cable 26 is activated to drive the lug 36 against the base of the pipe P, the lift cylinder 15 is activated, causing the A-frame lever 16 to rise, engaging the tracks 18 (or 18a) on the skirts 19 with the cam rollers 17. The conveyor unit C is thus pivoted upwardly about the pivot support pin 12.

When the correct vertical angular orientation of the trough T is achieved to allow passage of the pipe P to the derrick floor, extension of the lift cylinder 15 ceases, and the cable 26 is again activated, causing the lug 36 to push the pipe P forward to suitable mechanisms (not illustrated) on the derrick. These mechanisms remove the pipe P from the trough T. The fluid pressure in the lift cylinder 15 is then released to allow the weight of the conveyor unit C to depress the lift cylinder 15. The conveyor unit C then returns to its lower position, resting on the trough braces 20, and the collapsing A-frame lever 16 disengages from the tracks 18 (or 18a). The motor M is energized in the reverse direction to return the lug 36 toward the end of the trough T opposite the derrick, and the described process of loading the pipe P is repeated.

When a rotary driver 212 and friction clamp 210 are used to join two or more pipe sections P in the trough T, the joining operation occurs as the pipe sections P are loaded on the trough T, and before the cable 26 is activated to transfer the pipe P to the derrick.

To remove pipe P from the derrick, the above processes are generally reversed, with the lug 36, or rotary driver 212, now serving to catch the pipe as the conveyor cable C is driven or allowed to run, backward away from the derrick. When the pipe P is fully supported by the trough T, the conveyor unit C is lowered. if joined pipe P is being transferred, and is to be unthreaded or broken down, the rotary driver 212 and friction clamp 210 are used to break the threaded joints when the pipe P is fully supported by the trough T. the power jacks J are lowered to cause racked pipe to roll away from the conveyor C, studs 24a are put in place at the outside rail ends, and spacer extensions 27a are removed. To unload pipe P from the trough T, the tilt cylinder 13 is activated to rotate the conveyor unit C toward one pipe rack R or the other, allowing the pipe P to roll out of the trough T onto the rack bars 24, or onto the L-shaped pipe retaining members 27b, as the case may be. In the latter case, the feeders F, with lifters 21 turned to slope away from the conveyor unit C, lift the pipe P to the appropriate pipe rack spacer 27 level.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A pipe handling system for moving pipe between horizontal storage racks and a well drilling derrick comprising:
   a. rack means for receiving and storing a plurality of pipe sections in substantially a horizontal position;
   b. pipe handling means disposed adjacent said rack means for moving pipe sections onto and off of said rack means and for moving said pipe sections between said rack means and said derrick;
   c. elongate, pipe holding means included in said handling means for holding one or more pipe sections while said pipe sections are being moved between said rack means and said derrick, said holding means being pivoted at its first end and having its second end disposed adjacent said derrick;
   d. tilt means included with said handling means for effecting tilting movement of said holding means about a longitudinal axis for ejecting pipe sections from said holding means; and
   e. powered elevating means selectively engageable with connection means carried adjacent said second end of said pipe holding means for raising and lowering said second end to thereby pivot said holding means about said first end between a substantially horizontal position and an inclined position at which said second end is proximate the floor of said derrick, said powered elevating means including a third-order lever powered by a fluid driven piston and cylinder assembly whereby a relatively large lifting movement is effected at the lifting end of said levere for a smaller movement of said piston and cylinder assembly, said lever and holding means being selectively engageable through pin and track type connection means and said pin portion of said connection means being disengageable from said track portion of said connection means when said holding means is substantially horizontally disposed.

2. A pipe handling system as defined in claim 1 wherein:
   a. said holding means comprises an elongate central trough means supported between laterally spaced skirt support means;
   b. said skirt means carry said track portion of said connection means; and
   c. said lifting end of said lever carries said pin portion of said connection means, said pin portion being engageable in said track portion when said lever is operated to pivot said holding means.

3. A pipe handling system as defined in claim 2 wherein said track portion includes non-colinearly disposed track segments positioned on said skirt support means to cause a change in elevation of said second end of said holding means as said pin portion moves through said track segments.

4. A pipe handling system for moving pipe between horizontal storage racks and a well drilling derrick comprising:
   a. rack means for receiving and storing a plurality of pipe sections in substantially a horizontal position;
   b. pipe handling means disposed adjacent said rack means for moving pipe sections onto and off of said rack means and for moving said pipe sections between said rack means and said derrick;
   c. elongate, pipe holding means included in said handling means for holding one or more pipe sections while said pipe sections are being moved between said rack means and said derrick, said holding means being pivoted at its first end and having its second end disposed adjacent said derrick;
   d. tilt means included with said handling means for effecting tilting movement of said holding means about a longitudinal axis for ejecting pipe sections from said holding means;
   e. powered elevating means selectively engageable with connection means carried adjacent said second end of said pipe holding means for raising and lowering said second end to thereby pivot said holding means about said first end between a substantially horizontal position and an inclined position at which said second end is proximate the floor of said derrick; and
   f. means for preventing said holding means from tilting except while said holding means is substantially horizontally disposed.

5. A pipe handling system for moving pipe between horizontal storage racks and a well drilling derrick comprising:
   a. rack means for receiving and storing a plurality of pipe sections in substantially a horizontal position;
   b. pipe handling means disposed adjacent said rack means for moving pipe sections onto and off of said rack means and for moving said pipe sections between said rack means and said derrick;
   c. elongate, pipe holding means included in said handling means for holding one or more pipe sections while said pipe sections are being moved between said rack means and said derrick, said holding means being pivoted at its first end and having its second end disposed adjacent said derrick;
   d. tilt means included with said handling means for effecting tilting movement of said holding means about a longitudinal axis for ejecting pipe sections from said holding means;
   e. powered elevating means selectively engageable with connection means carried adjacent said second end of said pipe holding means for raising and lowering said second end to thereby pivot said holding means about said first end between a substantially horizontal position and an inclined position at which said second end is proximate the floor of said derrick;
   f. pipe lift means included in said pipe handling means and disposed adjacent said rack means and said holding means for elevating pipe sections relative to said holding means and said rack means, wherein:
      i. said pipe lift means includes vertically movable lift heads engageable with a pipe section on said rack means; and
      ii. said lift heads include adjustable, inclined surface means for rolling pipe sections carried on said heads toward or away from said holding means.

6. A pipe handling system as defined in claim 5 wherein:
   a. said lift means include a plurality of fluid driven piston and cylinder assemblies disposed betwen said holding means and said rack means; and
   b. each of said lift head means has an inclined top surface which is engageable with pipe on said rack means and is rotatably mounted on said assemblies whereby said head means may be rotated to position said inclined surface for rolling pipe sections supported by said lift heads in the direction of inclination of said top surface.

7. A pipe handling system for moving pipe between horizontal storage racks and a well drilling derrick comprising:
   a. rack means for receiving and storing a plurality of pipe sections in substantially a horizontal position;
   b. pipe handling means disposed adjacent said rack means for moving pipe sections onto and off of said rack means and for moving said pipe sections between said rack means and said derrick;
   c. elongate, pipe holding means included in said handling means for holding one or more pipe sections while said pipe sections are being moved between said rack means and said derrick, said holding means being pivoted at its first end and having its second end disposed adjacent said derrick;
   d. tilt means included with said handling means for effecting tilting movement of said holding means about a longitudinal axis for ejecting pipe sections from said holding means;
   e. powered elevating means selectively engageable with connection means carried adjacent said second end of said pipe holding means for raising and lowering said second end to thereby pivot said holding means about said first end between a substantially horizontal position and an inclined position at which said second end is proximate the floor of said derrick; and
   f. pipe rotating means in addition to the well drilling means employed in said well drilling derrick for imparting a rotary motion to a pipe section in said holding means.

8. A pipe handling system as defined in claim 7 wherein said pipe rotating means further includes rotatable, internal unthreaded pipe gripping means for engaging the internal surface of a pipe section to impart said rotary motion to said engaged pipe section.

9. A pipe handling system as defined in claim 8 further including pipe retaining means for holding one pipe section in said holding means stationary while said rotating means rotates a second pipe section relative to said held pipe section.

10. A pipe handling system for moving pipe between horizontal storage racks and a well drilling derrick comprising:
    a. rack means for receiving and storing a plurality of pipe sections in substantially a horizontal position;
    b. pipe handling means disposed adjacent said rack means for moving pipe sections onto and off of said rack means and for moving said pipe sections between said rack means and said derrick;
    c. elongate, pipe holding means included in said handling means for holding one or more pipe sections while said pipe sections are being moved between said rack means and said derrick, said holding means being pivoted at its first end and having its second end disposed adjacent said derrick;
    d. tilt means included with said handling means for effecting tilting movement of said holding means about a longitudinal axis for ejecting pipe sections from said holding means;
    e. powered elevating means selectively engageable with connection means carried adjacent said second end of said pipe holding means for raising and lowering said second end to thereby pivot said holding means about said first end between a substantially horizontal position and an inclined position at which said second end is proximate the floor of said derrick;
    f. longitudinal drive means included in said holding means extending longitudinally along said holding means;
    g. powering means included in said holding means for advancing said drive means longitudinally along said holding means;
    h. pipe drive means included in said holding means, said pipe drive means being connected with said drive means and engageable with a pipe section in said holding means for controlling longitudinal movement of said last mentioned pipe section along said holding means, wherein:
       i. said longitudinal drive means includes cable means;
       ii. said cable means is wrapped about a drive drum means;
       iii. said drum means is selectively connectable through a clutch means to a motor drive to provide said pipe drive means; and
       iv. tensioning means are provided for maintaining tension in said cable means.

11. A pipe handling system for moving pipe between horizontal storage racks and a well drilling derrick comprising:
    a. rack means for receiving and storing a plurality of pipe sections in substantially a horizontal position;
    b. pipe handling means disposed adjacent said rack means for moving pipe sections onto and off of said rack means and for moving said pipe sections between said rack means and said derrick;
    c. elongate, pipe holding means included in said handling means for holding one or more pipe sections while said pipe sections are being moved between said rack means and said derrick, said holding means being pivoted at its first end and having its second end disposed adjacent said derrick;
    d. tilt means included with said handling means for effecting tilting movement of said holding means about a longitudinal axis for ejecting pipe sections from said holding means;
    e. powered elevating means selectively engageable with connection means carried adjacent said second end of said pipe holding means for raising and lowering said second end to thereby pivot said holding means about said first end between a substantially horizontal position and an inclined position at which said second end is proximate the floor of said derrick, said powered elevating means including a third-order lever powered by a fluid driven piston and cylinder assembly whereby a relatively large lifting movement is effected at the lifting end of said lever for a smaller movement of said piston and cylinder assembly; and
    f. means for preventing said holding means from tilting except while said holding means is substantially horizontally disposed.

12. A pipe handling system as defined in claim 11 further including adjustable rack support means for inclining said rack means to cause pipe on said rack means to roll toward or away from said handling means.

13. A pipe handling system as defined in claim 12 wherein said tilt means includes tilt support means selectively engageable with said holding means for supporting said holding means in said horizontal position and for imparting said tilting movement to said holding means.

14. A pipe handling system as defined in claim 13 wherein said tilt means further includes a tilt powering means comprising an extensible and contractible, coaxially aligned, dual piston and cylinder assembly connected to said holding means and having means for forcing said holding means to tilt to either side from a central, upwardly directed position, for moving said holding means to said central position from a tilted position and for holding said holding means at said central position.

15. A pipe handling system as defined in claim 14 wherein said pipe handling means further includes pipe lift means disposed adjacent said rack means and said holding means for elevating one or more pipe sections relative to said holding means.

16. A pipe handling system as defined in claim 15 wherein said rack means includes multiple layer racking means for storing pipe sections on said rack means in multiple layers.

17. A pipe handling system as defined in claim 16 wherein said holding means includes:
 a. longitudinal drive means extending longitudinally along said holding means;
 b. powering means for advancing said drive means longitudinally along said holding means; and
 c. pipe drive means connected with said drive means and engageable with a pipe section in said holding means for controlling longitudinal movement of said last mentioned pipe section along said holding means.

18. A pipe handling system for moving pipe between horizontal storage racks and a well drilling derrick comprising:
 a. rack means for receiving and storing a plurality of pipe sections in substantially a horizontal position;
 b. pipe handling means disposed adjacent said rack means for moving pipe sections onto and off of said rack means and for moving said pipe sections between said rack means and said derrick;
 c. elongate, pipe holding means included in said handling means for holding one or more pipe sections while said pipe sections are being moved between said rack means and said derrick, said holding means being pivoted at its first end and having its second end disposed adjacent said derrick;
 d. tilt means included with said handling means for effecting tilting movement of said holding means about a longitudinal axis for ejecting pipe sections from said holding means;
 e. powered elevating means engageable with connection means carried adjacent said second end of said pipe holding means for raising and lowering said second end to thereby pivot said holding means about said first end between a substantially horizontal position and an inclined position at which said second end is proximate the floor of said derrick; and
 f. means for preventing said holding means from tilting except while said holding means is substantially horizontally disposed.

19. A pipe handling system as defined in claim 18 wherein said powered elevating means includes a third-order lever powered by a fluid driven piston and cylinder assembly whereby a relatively large lifting movement is effected at the lifting end of said lever for a smaller movement of said piston and cylinder assembly.

20. A pipe handling system as defined in claim 19 wherein said pipe handling means further includes pipe lift means disposed adjacent said rack means and said holding means for elevating pipe sections relative to said holding means and said rack means.

21. A pipe handling system as defined in claim 18 wherein said rack means includes multiple layer racking means for storing pipe sections on said rack means in multiple layers.

22. A pipe handling system as defined in claim 18 wherein said pipe handling means further includes pipe rotating means for imparting a rotary motion to a pipe section in said holding means.

23. A pipe handling system for moving pipe between horizontal storage racks and a well drilling derrick comprising:
 a. rack means for receiving and storing a plurality of pipe sections in substantially a horizontal position;
 b. pipe handling means disposed adjacent said rack means for moving pipe sections onto and off of said rack means and for moving said pipe sections between said rack means and said derrick;
 c. elongate, pipe holding means included in said handling means for holding one or more pipe sections while said pipe sections are being moved between said rack means and said derrick, said holding means being pivoted at its first end and having its second end disposed adjacent said derrick;
 d. tilt means included with said handling means for effecting tilting movement of said holding means about a longitudinal axis for ejecting pipe sections from said holding means;
 e. powered elevating means engageable with connection means carried adjacent said second end of said pipe holding means for raising and lowering said second end to thereby pivot said holding means about said first end between a substantially horizontal position and an inclined position at which said second end is proximate the floor of said derrick, said powered elevating means including a third-order lever powered by a fluid driven piston and cylinder assembly whereby relatively large lifting movement is effected at the lifting end of said lever for a smaller movement of said piston and cylinder assembly;
 f. means for preventing said holding means from tilting except while said holding means is substantially horizontally disposed;
 g. pipe lift means disposed adjacent said rack means and said holding means for elevating pipe sections relative to said holding means and said rack means, wherein:
  i. said pipe lift means includes vertically movable lift heads engageable with a pipe section on said rack means; and
  ii. said lift heads include adjustable, inclined surface means for rolling pipe sections carried on said heads toward or away from said holding means.

24. A pipe handling system for moving pipe between horizontal storage racks and a well drilling derrick comprising:
 a. rack means for receiving and storing a plurality of pipe sections in substantially a horizontal position;
 b. pipe handling means disposed adjacent said rack means for moving pipe sections onto and off of said rack means and for moving said pipe sections between said rack means and said derrick;
 c. elongate, pipe holding means included in said handling means for holding one or more pipe sections while said pipe sections are being moved between said rack means and said derrick, said holding means being pivoted at its first end and having its second end disposed adjacent said derrick;

d. tilt means included with said handling means for effecting tilting movement of said holding means about a longitudinal axis for ejecting pipe sections from said holding means;

e. powered elevating means engageable with connection means carried adjacent said second end of said pipe holding means for raising and lowering said second end to thereby pivot said holding means about said first end between a substantially horizontal position and an inclined position at which said second end is proximate the floor of said derrick;

f. pipe lift means disposed adjacent said rack means and said holding means for elevating one or more pipe sections relative to said holding means; wherein:

i. said pipe lift means includes vertically movable lift heads engageable with a pipe section on said rack means; and ii. said lift heads include adjustable, inclined surface means for rolling pipe sections carried on said heads toward or away from said holding means.

25. A pipe handling system as defined in claim 24 wherein:

a. said lift means include a plurality of fluid driven piston and cylinder assemblies disposed between said holding means and said rack means; and b. each of said lift head means has an inclined top surface which is engageable with pipe on said rack means and is rotatably mounted on said assemblies whereby said head means may be rotated to position said inclined surface for rolling pipe sections supported by said lift heads in the direction of inclination of said top surface.

26. A pipe handling system for moving pipe between horizontal storage racks and a well drilling derrick comprising:

a. rack means for receiving and storing a plurality of pipe sections in substantially a horizontal position;

b. pipe handling means disposed adjacent said rack means for moving pipe sections onto and off of said rack means and for moving said pipe sections between said rack means and said derrick;

c. elongate, pipe holding means included in said handling means for holding one or more pipe sections while said pipe sections are being moved between said rack means and said derrick, said holding means being pivoted at its first end and having its second end disposed adjacent said derrick;

d. tilt means included with said handling means for effecting tilting movement of said holding means about a longitudinal axis for ejecting pipe sections from said holding means;

e. powered elevating means engageable with connection means carried adjacent said second end of said pipe holding means for raising and lowering said second end to thereby pivot said holding means about said first end between a substantially horizontal position and an inclined position at which said second end is proximate the floor of said derrick;

f. pipe lift means disposed adjacent said rack means and said holding means for elevating one or more pipe sections relative to said holding means, said pipe handling means further including pipe rotating means in addition to the well drilling means employed in said drilling derrick for imparting a rotary motion to a pipe section in said holding means.

27. A pipe handling system for moving pipe between horizontal storage racks and a well drilling derrick comprising:

a. rack means for receiving and storing a plurality of pipe sections in substantially a horizontal position;

b. pipe handling means disposed adjacent said rack means for moving pipe sections onto and off of said rack means and for moving said pipe sections between said rack means and said derrick;

c. elongate, pipe holding means included in said handling means for holding one or more pipe sections while said pipe sections are being moved between said rack means and said derrick, said holding means being pivoted at its first end and having its second end disposed adjacent said derrick;

d. tilt means included with said handling means for effecting tilting movement of said holding means about a longitudinal axis for ejecting pipe sections from said holding means;

e. powered elevating means engageable with connection means carried adjacent said second end of said pipe holding means for raising and lowering said second end to thereby pivot said holding means about said first end between a substantially horizontal position and an inclined position at which said second end is proximate the floor of said derrick; and f. pipe rotating means in addition to the well drilling means employed in said drilling derrick for imparting a rotary motion to a pipe section in said holding means.

28. A pipe handling system as defined in claim 27 wherein said pipe rotating means furhter includes rotatable, internal unthreaded pipe gripping means for engaging the internal surface of a pipe section to impart said rotary motion to said engaged pipe section.

29. A pipe handling system as defined in claim 28 further including pipe retaining means for holding one pipe section in said holding means stationary while said rotating means rotates a second pipe section relative to said held pipe section.

* * * * *

UNITED STATES PATENT OFFICE
CERTIFICATE OF CORRECTION

Patent No. 3,916,500        Dated November 4, 1975

Inventor(s)   CICERO C. BROWN

It is certified that error appears in the above-identified patent and that said Letters Patent are hereby corrected as shown below:

Column 5, line 44, after "13," please delete "in";

Column 6, line 35, after "are", please delete "more";

Column 9, line 19, "draft" should be -- shaft --;

Column 13, line 34, please delete "unthreaded";
line 35, before "surface", please insert -- unthreaded --;

Column 18, line 48, "furhter" should be -- further --;
line 49, please delete "unthreaded";
line 50, before "surface", please insert -- unthreaded --.

Signed and Sealed this ninth Day of March 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,916,500　　　　　　　　　　Dated November 4, 1975

Inventor(s)　　　Cicero C. Brown　　　　　　Page 1 of 2

It is certified that error appears in the above-identified patent and that said Letters Patent are hereby corrected as shown below:

In the grant (Only), column 8 should appear as shown on the attached sheet.

Signed and Sealed this twenty-fifth Day of May 1976

[SEAL]

Attest:

RUTH C. MASON
*Attesting Officer*

C. MARSHALL DANN
*Commissioner of Patents and Trademarks* engagement with the clutch 112. A fluid pressure cylinder 114 is operable to drive the shaft 115 in the opposite direction when the pressure in the cylinder 114 is increased, causing the gear wheel 111 to disengage from the clutch 112. Thus, to drive the conveyor cable 26, the pressure cylinder 114 is deenergized so that the drive shaft 110 is connected to the motor M1 by action of the spring 116. Activation of the motor M1 causes the cable 26 to move. To allow the cable 26 to move freely, the motor M1 is stopped, and the pressure on the fluid pressure cylinder 114 is increased to disengage the gear wheel 111 from the clutch 112, permitting the drive shaft 110 to be moved independently of the motor M1. Braking is effected by stopping the motor with the cylinder 114 deenergized.

FIGS. 17–21 illustrate an embodiment of a mechanism for threadedly joining two or more pipe sections P1 and P2 in the trough T. FIG. 17 illustrates the replacement of the lug 36 with a rotary driver, shown generally at 212. The end of a first pipe section P1 positioned in the trough T is engaged by the driver 212 which in turn is attached to the cable 26. The first pipe section P1 is advanced to the forward end of the conveyor C, the driver 212 is returned to its initial position in the conveyor C, and a second pipe section P2 is placed in the trough T. A friction clamp 210, mounted on the conveyor unit C and activated by a power cylinder 211 (FIG. 18), locks the first pipe section P1 against rotary motion. The rotary driver 212 is then grippingly engaged with the second pipe section P2, and driven by a motor M2 to rotate the second pipe section P2 with respect to the first section P1. When the screw connection is complete between the pipe sections P1 and P2, the gripping engagement of the rotary driver 212 is disengaged from the pipe P2, and the joined pipe segments are advanced to the derrick floor by driving the conveyor cable 26. Additional pipe sections P3, etc. may also be joined to the first two sections by engaging the last-joined section by the friction clamp 210 while a new pipe section is rotated by the rotary driver 212.

One embodiment of a suitable rotary driver 212 is shown in FIG. 19. A tubular housing 213 encloses a driver probe 214 comprising a tapered head 214a, and a longitudinally grooved shaft 217. A ring gear 216, slidably mounted on and rotatably fixed to the shaft 217, is held in place by ball bearings 222 acting against internal housing shoulders 213a and 213b. The shaft 217 is fitted with a piston head 219 held in place by ball bearings 224. The piston head 219 is slidably sealed in the bore of the housing 213 by an O-ring seal 225. The ball bearings 224 allow rotation of the shaft 217 with respect to the piston head 219.

A fluid pressure chamber 220 is formed between the base of the housing 213 and the piston head 219. A compressed spring 218, compressed between the piston head 219 and the internal housing shoulder 213a, biases the piston head 219 in a direction tending to reduce the volume of the pressure chamber 220. To engage a pipe P, fluid pressure in the pressure chamber 220 is increased through a pressure line 221, expanding the pressure chamber 220, and causing the piston head 219 and the shaft 217 to advance and collapse the spring 218. When the forward section of the driver probe 214 is pushed inside the pipe P, as shown in FIG. 20, a motor M2, engaging the ring gear 216 through a drive gear 215, operates the driver probe 214 in rotary motion about its cylindrical axis. Initial rotary motion